(12) United States Patent
Bae et al.

(10) Patent No.: US 10,355,299 B2
(45) Date of Patent: Jul. 16, 2019

(54) REINFORCED COMPOSITE MEMBRANES AND METHOD FOR MANUFACTURING THE SAME

(71) Applicant: KOREA INSTITUTE OF ENERGY RESEARCH, Daejeon (KR)

(72) Inventors: Byungchan Bae, Daejeon (KR); Hyejin Lee, Busan (KR); Sung-Dae Yim, Daejeon (KR); Chang-Soo Kim, Incheon (KR); Won-Yong Lee, Daejeon (KR); Gu-Gon Park, Daejeon (KR); Tae-Hyun Yang, Daejeon (KR); Seok-Hee Park, Daejeon (KR); Minjin Kim, Daejeon (KR); Young-Jun Sohn, Daejeon (KR); Seung-Gon Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 252 days.

(21) Appl. No.: 15/364,959

(22) Filed: Nov. 30, 2016

(65) Prior Publication Data
US 2017/0179514 A1    Jun. 22, 2017

(30) Foreign Application Priority Data
Dec. 21, 2015    (KR) ........................ 10-2015-0182965

(51) Int. Cl.
*H01M 8/10* (2016.01)
*H01M 8/18* (2006.01)
(Continued)

(52) U.S. Cl.
CPC ......... *H01M 8/1062* (2013.01); *H01M 8/106* (2013.01); *H01M 8/1023* (2013.01);
(Continued)

(58) Field of Classification Search
CPC ............ H01M 8/1062; H01M 8/1053; H01M 8/1055; H01M 8/106; H01M 8/1023;
(Continued)

(56) References Cited

U.S. PATENT DOCUMENTS

| 2011/0104367 A1* | 5/2011 | Haring ............... B01D 67/0093 427/115 |
| 2011/0165497 A1 | 7/2011 | MacKinnon et al. |

FOREIGN PATENT DOCUMENTS

| EP | 2 842 620 A1 | 3/2015 |
| JP | 9-309173 A | 12/1997 |

(Continued)

OTHER PUBLICATIONS

Office Action dated Jan. 18, 2016 issued in counterpart KR application No. 10-2015-0182965. (7 pages).
(Continued)

*Primary Examiner* — Michael Bernshteyn
(74) *Attorney, Agent, or Firm* — Westerman, Hattori, Daniels & Adrian, LLP

(57) ABSTRACT

Provided are a reinforced composite membrane and a method of manufacturing the reinforced composite membrane, and more particularly, a reinforced composite membrane including a porous support layer; and an electrolyte membrane layer formed on one surface or each of both surfaces of the porous support layer, at least a portion of the porous support layer being impregnated with an electrolyte, and a method of manufacturing the reinforced composite membrane. The reinforced composite membrane may enhance an interfacial adhesive force between a support and the electrolyte membrane layer, and may be manufactured on a continuous mass production.

7 Claims, 7 Drawing Sheets

(a)

(51) Int. Cl.
  *H01M 8/1062* (2016.01)
  *H01M 8/1053* (2016.01)
  *H01M 8/1041* (2016.01)
  *H01M 8/106* (2016.01)
  *H01M 8/1023* (2016.01)
  *H01M 8/1027* (2016.01)
  *H01M 8/1032* (2016.01)
  *H01M 8/1039* (2016.01)
  *H01M 8/1081* (2016.01)
  *H01M 8/1086* (2016.01)
  *H01M 8/1018* (2016.01)

(52) U.S. Cl.
  CPC ....... *H01M 8/1027* (2013.01); *H01M 8/1032* (2013.01); *H01M 8/1039* (2013.01); *H01M 8/1053* (2013.01); *H01M 8/1055* (2013.01); *H01M 8/1081* (2013.01); *H01M 8/1093* (2013.01); *H01M 8/188* (2013.01); *H01M 2008/1095* (2013.01); *H01M 2250/20* (2013.01); *Y02E 60/521* (2013.01); *Y02E 60/528* (2013.01); *Y02P 70/56* (2015.11); *Y02T 90/32* (2013.01)

(58) Field of Classification Search
  CPC ............ H01M 8/1027; H01M 8/1032; H01M 8/1039; H01M 8/1081; H01M 8/1093; H01M 8/188; Y02E 60/528; Y02E 60/521; Y02P 70/56; Y02T 90/32
  USPC .......................................................... 521/27
  See application file for complete search history.

(56) References Cited

FOREIGN PATENT DOCUMENTS

| | | |
|---|---|---|
| JP | 10-72775 A | 3/1998 |
| JP | 2004-178995 A | 6/2004 |
| JP | 2005-276747 A | 10/2005 |
| JP | 2010-123438 A | 6/2010 |
| JP | 2014-75354 A | 4/2014 |
| JP | 2014-525115 A | 9/2014 |
| KR | 2001-0061632 A | 7/2001 |
| KR | 1020010061632 * | 3/2002 |
| KR | 2007-0019868 A | 2/2007 |
| KR | 2007-0087454 A | 8/2007 |
| KR | 2008-0022675 A | 3/2008 |
| KR | 2009-0062790 A | 6/2009 |
| KR | 1020090062790 * | 6/2009 |
| KR | 2014-0085885 A | 7/2014 |
| KR | 2015-0054370 A | 5/2015 |
| WO | 2010/044436 A1 | 4/2010 |
| WO | 2011/057769 A1 | 5/2011 |
| WO | 2012/174463 A1 | 12/2012 |

OTHER PUBLICATIONS

Office Action dated May 30, 2016, issued in counterpart KR application No. 10-2015-0182965. (6 pages).

Office Action dated Aug. 17, 2018, issued in counterpart European Application No. 16199443.9. (5 pages).

* cited by examiner

FIG. 1A
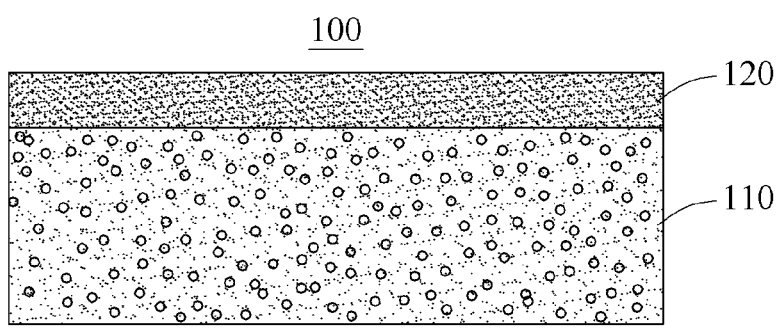
(a)
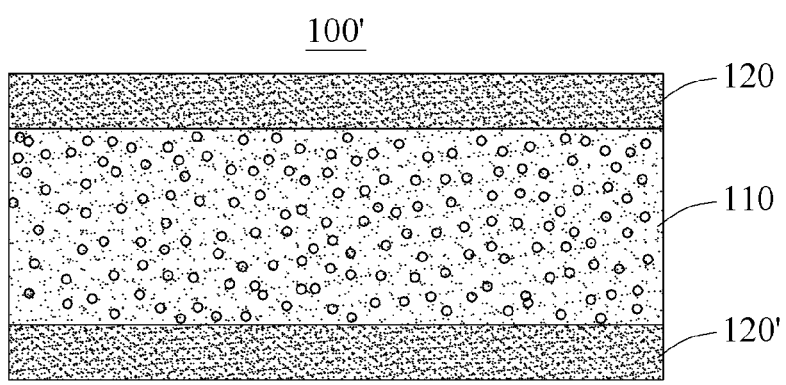
(b)

FIG. 1B
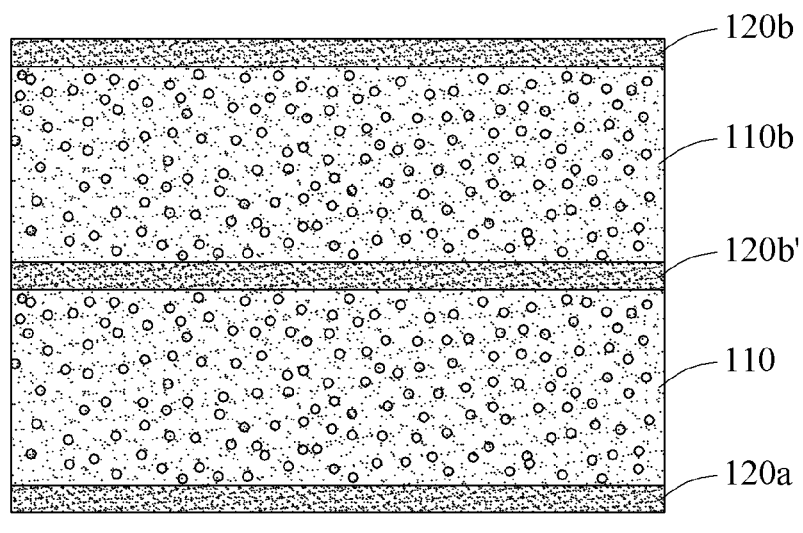
(a)
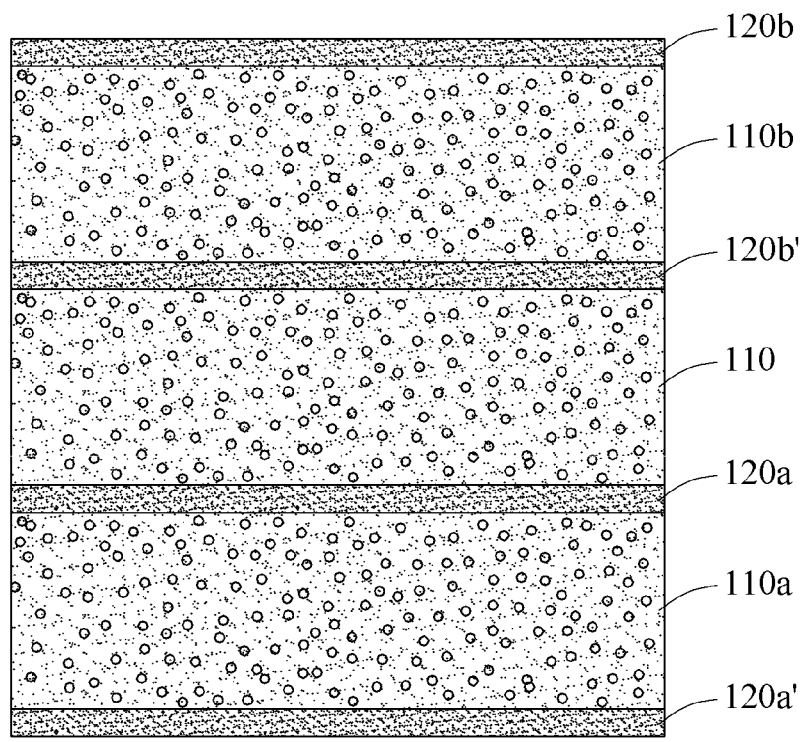
(b)

REINFORCED COMPOSITE MEMBRANES AND METHOD FOR MANUFACTURING THE SAME

CROSS-REFERENCE TO RELATED APPLICATION(S)

This application claims the priority benefit of Korean Patent Application No. 10-2015-0182965 filed on Dec. 21, 2015, in the Korean Intellectual Property Office, the disclosure of which is incorporated herein by reference for all purposes.

BACKGROUND

1. Field

At least one example embodiment relates to a reinforced composite membrane and a method of manufacturing the reinforced composite membrane.

2. Description of Related Art

One of key parts that constitute a fuel cell is a polymer electrolyte membrane (PEM). This PEM is a part to perform actual hydrogen ion conduction in the fuel cell, and is also a very important part to determine the performance of the fuel cell and the economical efficiency.

A perfluorinated electrolyte membrane currently in commercialization has some advantages, such as an excellent mechanical strength and electrochemical characteristic, and also has some disadvantages, such as relatively high cost by a complex production process and a relatively low glass transition temperature by a fluorinated structure. To overcome the disadvantages, the development of hydrocarbon polymer has been actively conducted. In addition, the development of a hydrocarbon based membrane has been reported, which may be manufactured at relatively low cost and thermally further stable compared to a perfluorinated polymer electrolyte membrane. However, due to a wet/dry cycle during an operation of the fuel cell, the mechanical strength of a membrane may become weak, which may result in causing a fracture or a crack in the membrane.

Currently, a reinforced composite membrane in which a thermally and mechanically stable porous reinforced support is impregnated with an electrolyte has been developed. A brushing or impregnation process by vacuum is performed a plurality of number of times to impregnate a porous reinforced support with an electrolyte. Alternatively, a method of employing a surfactant is applied to enhance an interfacial adhesive force between a hydrophobic porous reinforced support and an electrolyte. In the case of using such existing impregnation methods, a large scale manufacture is difficult and a relatively long process time is required. Further, damage to a reinforced support frequently occurs and uniform electrolyte impregnation is difficult. Also, since an interfacial adhesion between an electrolyte and a support varies based on a type of the support, it is difficult to adjust an interfacial adhesive force. In particular, a reinforced composite membrane currently applicable to a vehicle uses a very thin membrane with a thickness of 20 μm or less to enhance the performance of a fuel cell. An existing method has some constraints in thinness due to an electrolyte remaining on the surface.

SUMMARY

At least one example embodiment provides a reinforced composite membrane that may enhance an interfacial adhesive force between a porous support and an electrolyte without using additives, such as a surfactant and the like.

At least one example embodiment also provides a method of manufacturing a reinforced composite membrane that may simplify a reinforced composite membrane manufacturing process, may induce the uniform electrolyte impregnation, and enables a thinness of an electrolyte membrane.

Other features and aspects will be apparent from the following detailed description.

According to an aspect of at least one example embodiment, there is provided a reinforced composite membrane including a composite membrane including a porous support layer; and an electrolyte membrane layer formed on one surface or each of both surfaces of the porous support layer. At least a portion of the porous support layer is impregnated with an electrolyte.

The porous support layer may have a thickness of 1 μm to 30 μm, and the porous support layer may have a porosity of 50% or more, and may includes pores each with the diameter of 0.3 μm to 1 μm.

The porous support layer includes a porous support including at least one selected from polytetrafluoroethylene (PTFE), polyethylene (PE), polyvinylidene fluoride (PVDF), polyimide (PI), polypropylene (PP), cellulose, and nylon.

The electrolyte may include at least one of a perfluorinated polymer and a sulfonated hydrocarbon based polymer.

0.5 to 5 parts by weight of an additive may be further provided with respect to 100 parts by weight of the electrolyte, and the additive may include at least one selected from transition metal salts; at least one organic compound selected from 2, 2'-bipyridine, hydroquinone, pyrazine-2,3-carboxylic acid, pyrazine-2,3-dicarboxylic acid, 2(-naphthalene-2-yl)-1-(naphthalene-7-yl)hydrazine, and 1,3-Di(4-pyridyl)propane; cerium (III) trifluoromethane sulfonate; cerium (III) trifluoroacetylacetonate; tris(5-prolinato-N1, O2)-(9CI) cerium (III).

An content of electrolyte within the porous support layer may be 90% or more.

A thickness of a non-impregnated electrolyte layer on the surface of reinforced composite membrane may be 5 μm or less.

The reinforced composite membrane may be one of a polymer electrolyte membrane, a polymer electrolyte membrane for water electrolysis, a Redox flow battery electrolyte membrane, a large energy storage device electrolyte membrane, salinity gradient power generation electrolyte membrane, a water separation membrane, a gas separation membrane, and a water purification membrane.

The reinforced composite membrane may be a multilayered reinforced composite membrane in which two or more composite membranes are stacked.

According to another aspect of at least one example embodiment, there is provided a method of manufacturing a reinforced composite membrane, the method including casting an electrolyte film that forms an electrolyte membrane on a release film; disposing the electrolyte film on one surface or each of both surfaces of a porous support; and transferring the electrolyte membrane of the electrolyte film from releasing film on one surface or each of both surfaces of the porous support to form a composite membrane. The transferring is performed through a roll press process, and at least a portion of the porous support is impregnated with an electrolyte during the transferring.

The electrolyte membrane may be formed using an electrolyte solution that includes the electrolyte and a polar solvent, and the electrolyte may be included in the electrolyte solution at the concentration of 5 to 30% (w/v).

The reinforced composite membrane manufacturing method may further include drying the electrolyte film after manufacturing the electrolyte film. The drying may include forming the electrolyte membrane with a thickness of 3 μm to 30 μm at the temperature of 90° C. to 150° C. after removing a solvent at the temperature of 40° C. to 80° C.

The reinforced composite membrane manufacturing method may further include pretreatmenting the electrolyte film by spraying a polar solvent over the electrolyte film, prior to the disposing of the electrolyte film.

The reinforced composite membrane manufacturing method may further include pretreatmenting the porous support by immersing the porous support into a polar solution for impregnation, prior to the disposing of the electrolyte film. The pretreatment of the porous support may be implemented at a room temperature to 50° C. for 30 minutes to 5 hours.

The reinforced composite membrane manufacturing method may further include separating the release film from one surface of the composite membrane after the transferring; disposing the composite membrane to make an electrolyte membrane layer from which the release film is separated contact with one surface or each of both surfaces of the porous support; and transferring the electrolyte membrane of the composite membrane on one surface or each of both surfaces of the porous support.

The reinforced composite membrane manufacturing method may further include separating the release film from one surface of the composite membrane after the transferring; disposing the composite membrane and the electrolyte film to make each of an electrolyte membrane layer from which the release film is separated and the electrolyte membrane of the electrolyte film contact with one surface of the porous support; and transferring the electrolyte membrane to each of both surfaces of the porous support.

According to some example embodiments, there may be provided a reinforced composite membrane that may enhance an interface stability regardless of a physical property of an electrolyte or a porous support.

Also, according to some example embodiments, there may be provided a reinforced composite membrane that may enhance a mechanical strength by a porous support, may also enhance a thermal stability, a durability, and a dimensional stability, and may also enhance the performance by reducing thickness of an electrolyte membrane.

Also, according to some example embodiments, it is possible to increase a amount or content of electrolyte used to impregnate a porous support.

Also, according to some example embodiments, there may be provided a method of manufacturing a reinforced composite membrane that enables a mass production and a continuous process of a multilayered reinforced composite membrane and may also save a production time and production cost.

Also, according to some example embodiments, there may be provided a method of manufacturing a reinforced composite membrane with a thin thickness and a large area.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 1A, (a) and (b), are cross-sectional views illustrating an example of a reinforced composite membrane according to at least one example embodiment;

FIG. 1B, (a) and (b), are cross-sectional views illustrating another example of a reinforced composite membrane according to at least one example embodiment;

DETAILED DESCRIPTION

Figure 2:
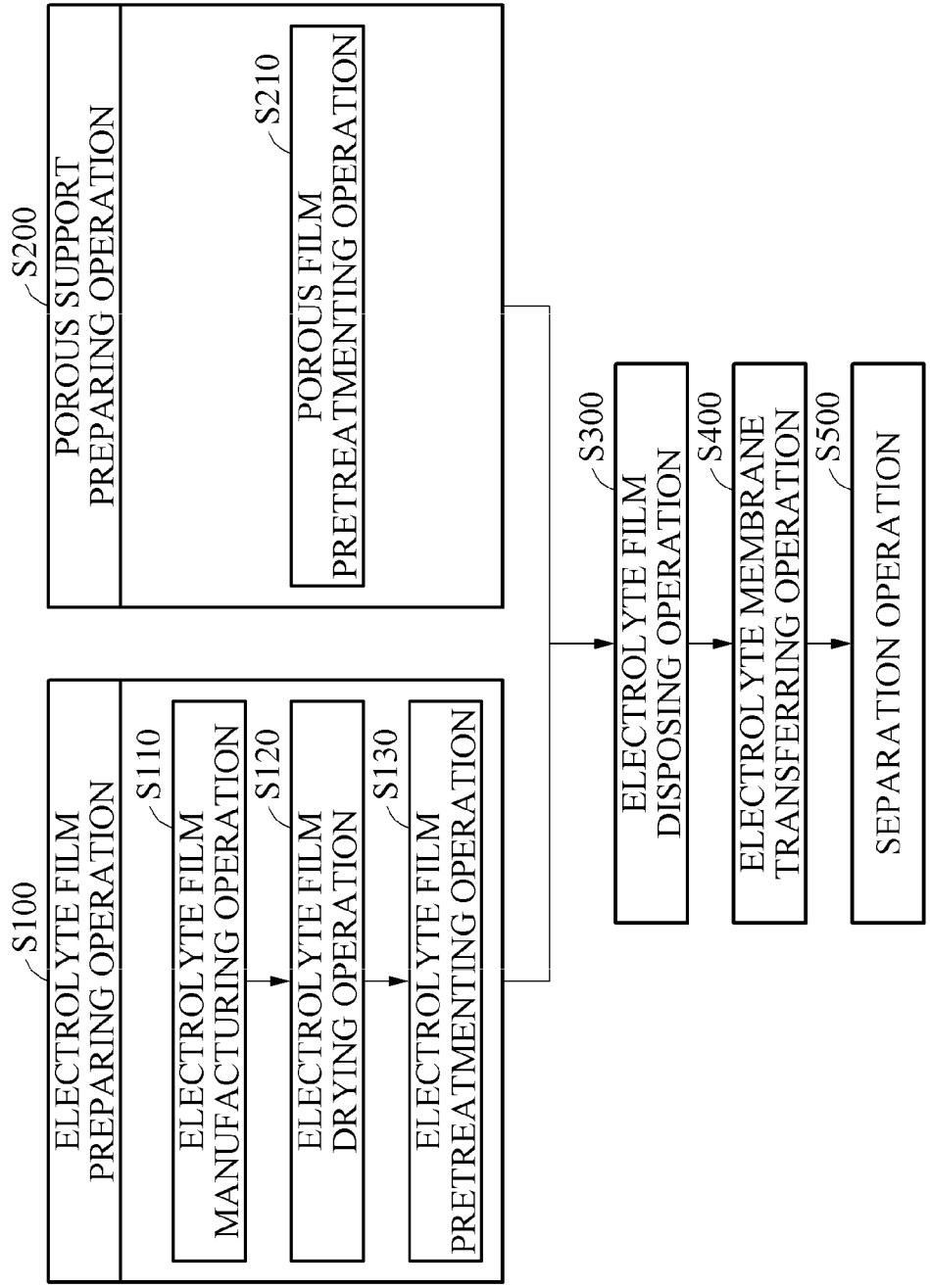
FIG. 2 is a flowchart illustrating an example of a method of manufacturing a reinforced composite membrane according to at least one example embodiment.

Hereinafter, some example embodiments will be described in detail with reference to the accompanying drawings. In the description of example embodiments, detailed description of well-known related structures or functions will be omitted when it is deemed that such description will cause ambiguous interpretation of the present disclosure. Also, terminologies used herein are defined to appropriately describe the example embodiments and thus, may be changed depending on a user, the intent of an operator, or a custom. Accordingly, the terms must be defined based on the following overall description of this specification. Regarding the reference numerals assigned to the elements in the drawings, it should be noted that the same elements will be designated by the same reference numerals, wherever possible, even though they are shown in different drawings.

At least one example embodiment provides a reinforced composite membrane. The reinforced composite membrane includes a composite membrane including a support and an electrolyte membrane. The support may be uniformly impregnated with the electrolyte, and an interfacial adhesive force between a porous support and the electrolyte membrane may be enhanced. Thus, the disclosed reinforced composite membrane may provide an excellent chemical and mechanical durability and dimensional stability. The reinforced composite membrane will be described with reference to FIGS. 1A and 1B. The terms "membrane" and "support" are used during a manufacturing process before manufacturing a composite membrane and the terms "membrane layer" and "support layer" are used in association with the manufactured composite membrane. Thus, they may be interchangeably used throughout. For example, the terms "support" and "support layer", "electrolyte membrane" and "electrolyte membrane layer", etc., may be interchangeably used.

FIG. 1A, (a) and (b), are cross-sectional views illustrating an example of a reinforced composite membrane according to at least one example embodiment. Referring to (a) of FIG. 1A, a reinforced composite membrane 100 may include a porous support layer 110 and an electrolyte membrane layer 120.

For example, the porous support layer 110 may include an electrolyte used to impregnate at least a portion of the porous support layer 110 to enhance a mechanical performance and a chemical stability of the electrolyte membrane layer 120. For example, the electrolyte may be partially or entirely impregnated in a depth direction of the porous support layer 110, and 90% or more of the entire volume of the porous support layer 110 may be impregnated with the electrolyte. The impregnated electrolyte may be the same as that applied to the electrolyte membrane layer 120.

For example, the porous support layer 110 may include a single layered or a multilayered porous support. Any type of porous supports applicable to a fuel cell may be employed without restriction. The porous support layer 110 may include a porous support including at least one of polytetrafluoroethylene (PTFE), polyethylene (PE), polyvinylidene fluoride (PVDF), polyimide (PI), polypropylene (PP), cellulose, and nylon. The porous support may include, desirably, polytetrafluoroethylene (PTFE) and polyethylene (PE).

For example, the porous support layer 110 may have a porosity of 50% or more, and may include pores each with the diameter of 0.3 μm to 1 μm, desirably, 0.4 μm to 0.8 μm to increase an amount of impregnated electrolyte and to provide a stable mechanical property.

For example, the porous support layer 110 may have a thickness of 1 μm to 30 μm, desirably, 5 μm to 25 μm. If the thickness of the porous support layer 110 is included in the aforementioned thickness range, it is possible to induce the uniform electrolyte impregnation and to prevent a decrease in the performance of the reinforced composite membrane from occurring due to an increase in the thickness of the porous support layer 110.

For example, the electrolyte membrane layer 120 may include a polymer electrolyte formed on one surface of the porous support layer 110 and having a relatively high ionic conductance.

For example, the polymer electrolyte may include at least one of a perfluorinated polymer and a sulfonated hydrocarbon based polymer. For example, the sulfonated hydrocarbon based polymer may be sulfonated poly(arylene ether sulfone) (S-PES), sulfonated polybenzimidazole (S-PBI), sulfonated poly(ether ether ketone) (S-PEEK), poly(paraphenylene) (S-PP), sulfonated polyimide (S-PI), sulfonated polysulfone (S-PS), sulfonated polyphenylsulfone expressed by the following Formula 1 and Formula 2, etc. Desirably, the sulfonated hydrocarbon based polymer may be sulfonated polyphenylsulfone expressed by the following Formula 1 and Formula 2. For example, the perfluorinated polymer may be nafion (DuPont company) expressed by the following Formula 3, flemion (Asahi Glass company), asiplex (Asahi Chemical company), Dow XUS (Dow Chemical company), aquivion (Solvay company), and the like. Desirably, the perfluorinated polymer may be nafion.

In Formula 2, R denotes inorganic cation selected from H, K, Li, Na, Rb, and Cs, or organic cation selected from N+R1R2R3R4 (ammonium), P+R1R2R3R4 (phosphonium), N+NR1R2R3R4R5 (imidazolium), NH+R1R2R3R4R5 (pyridinium), pyrrolidinium, and sulphonium, each of X and Y denotes a number between 5 and 50, n denotes an integer between 2 and 50, and $R_1$, $R_2$, $R_3$, $R_4$, and $R_5$ are linear alkyl or branched alkyl of C1 to C7.

[Formula 3]

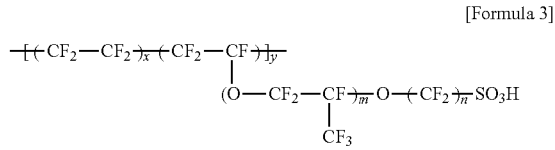

In Formula 3, m>0, n=1 to 5, x=1 to 14, and y=200 to 1000.

For example, the electrolyte membrane layer 120 refers to a portion that includes an electrolyte not used to impregnate the porous support layer 110, and may have a thickness of 5 μm or less, desirably, 3 μm or less. The electrolyte membrane layer 120 within the thickness range may be formed to have a thin thickness of 5 μm or less. Accordingly, it is possible to enhance a mechanical strength of the reinforced composite membrane, and to reduce a thickness of a reinforced composite membrane-electrode assembly. As a result, it is possible to decrease cell resistance and production cost at the same time.

For example, the reinforced composite membrane 100 may further include an additive that includes an organic material, such as radical quencher, etc., an inorganic material, an organic-inorganic assembly, and the like, in order to enhance the performance of an electrolyte membrane, an ion diffusion, an ion conduction a battery performance, and the like, based on an application field of the reinforced composite membrane. For example, the additive may be transi-

[Formula 1]

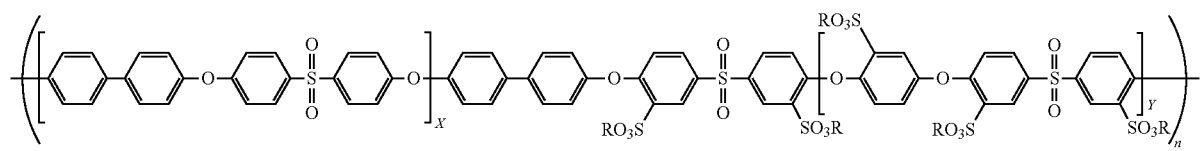

In Formula 1, R denotes inorganic cation selected from H, K, Li, Na, Rb, and Cs, or organic cation selected from N+R1R2R3R4 (ammonium), P+R1R2R3R4 (phosphonium), N+NR1R2R3R4R5 (imidazolium), NH+R1R2R3R4R5 (pyridinium), pyrrolidinium, and sulphonium, each of X and Y denotes a number between 5 and 50, n denotes an integer between 2 and 50, and $R_1$, $R_2$, $R_3$, $R_4$, and $R_5$ are linear alkyl or branched alkyl of C1 to C7.

tion metal salts, such as cerium (III) salts, etc.; an organic compound, such as 2,2'-bipyridine, hydroquinone, pyrazine-2,3-carboxylic acid, pyrazine-2,3-dicarboxylic acid, 2(-naphthalene-2-yl)-1-(naphthalene-7-yOhydrazine, 1,3-Di (4-pyridyl)propane, etc.; or cerium(III) trifluoromethane sulfonate, tris(5-oxo-L-prolinato-N1,O2)-(9CI) cerium (III), and the like. However, the present disclosure is not limited thereto.

[Formula 2]

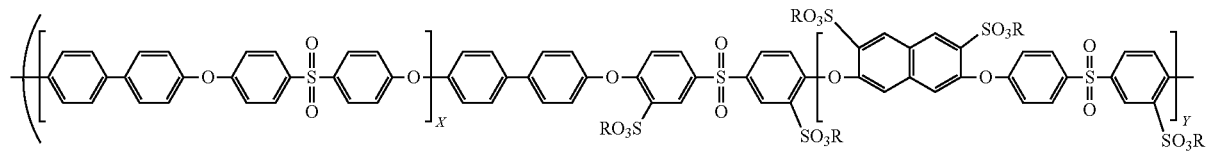

The additive may be included in at least one of the porous support layer 110 and the electrolyte membrane layer 120. 0.5 to 5 parts by weight, desirably, 0.5 to 2 parts by weight, of the additive may be included with respect to 100 parts by weight of the electrolyte.

Referring to (b) of FIG. 1A, a reinforced composite membrane 100' may include a composite membrane in which electrolyte membrane layers 120 and 120' are formed on both surfaces of the porous support layer 110, respectively. The porous support layer 110 is the same as the aforementioned porous support layer 110. The electrolyte membrane layer 120 and the electrolyte membrane layer 120' may include the same or different electrolyte or may have the same or different thickness.

According to another example embodiment, a reinforced composite membrane may be a multilayered reinforced composite membrane in which two or more composite membranes are stacked. FIG. 1B, (a) and (b), are cross-sectional views illustrating another example of a reinforced composite membrane according to at least one example embodiment. Referring to (a) of FIG. 1B, the reinforced composite membrane may include a first composite membrane that includes a porous support layer 110 impregnated with an electrolyte and an electrolyte membrane layer 120a; and a multilayered reinforced composite membrane that includes a porous support layer 110b impregnated with an electrolyte and electrolyte membrane layers 120b and 120b'. Referring to (b) of FIG. 1B, the reinforced composite membrane may include a first composite membrane that includes the porous support layer 110a impregnated with an electrolyte and the electrolyte membrane layers 120a and 120a'; a second composite membrane that includes a porous support layer 110b impregnated with an electrolyte and the electrolyte membrane layers 120b and 120b'; and a multilayered reinforced composite membrane that includes the porous support layer 110 between the first composite membrane and the second composite membrane. The multilayered reinforced composite membrane may include the same or different electrolyte membrane layers and porous supports.

According to some example embodiments, the reinforced composite membrane may be applicable to a cell, a power generation, a battery, an energy storage device, a separation membrane, and the like, to which a polymer electrolyte is applied. For example, the reinforced composite membrane may be applicable as a polymer electrolyte membrane of a fuel cell, such as a hydrogen ion exchange membrane fuel cell, a methanol fuel cell, etc.; a polymer electrolyte membrane for water electrolysis; a Redox flow battery electrolyte membrane; a large energy storage device electrolyte membrane; salinity gradient power generation electrolyte membrane; a freshwater separation membrane, a gas separation membrane, a water purification separation membrane, and the like.

At least one example embodiment provides a method of manufacturing a reinforced composite membrane that may achieve a relatively high amount of impregnated electrolyte by enhancing an interfacial stability between an electrolyte and a reinforced support and by enhancing the permeability of the electrolyte into the reinforced support. The method of manufacturing the reinforced composite membrane will be described with reference to FIGS. 2 through 6.

FIG. 2 is a flowchart illustrating an example of a method of manufacturing a reinforced composite membrane according to at least one example embodiment. Referring to FIG. 2, the method of manufacturing a reinforced composite membrane may include an electrolyte film preparing operation S100, a porous support preparing operation S200, an electrolyte film disposing operation S300, an electrolyte membrane transferring operation S400, and a separation operation S500.

Figure 3:
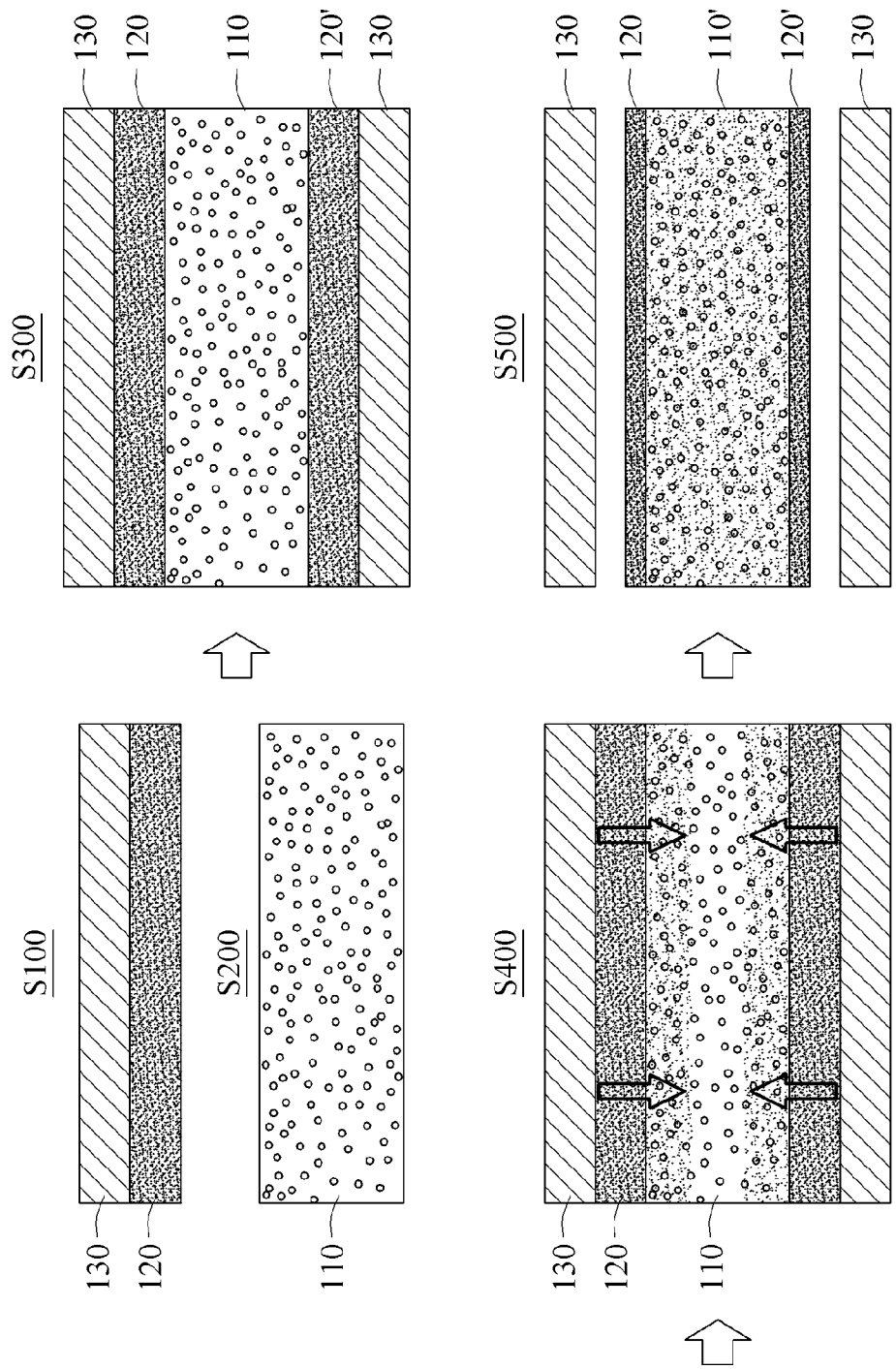
FIG. 3 illustrates an example of a process of manufacturing a reinforced composite membrane according to at least one example embodiment.

The reinforced composite membrane manufacturing process of FIG. 2 will be described with reference to FIG. 3. Here, FIG. 3 illustrates an example of a process of manufacturing a reinforced composite membrane according to at least one example embodiment. The electrolyte film preparing operation S100 is an operation of preparing an electrolyte film to provide an electrolyte to the reinforced composite membrane, and may include an electrolyte film manufacturing operation S110, an electrolyte film drying operation S120, and an electrolyte film pretreatmenting operation S130.

For example, the electrolyte film manufacturing operation S110 is an operation of manufacturing the electrolyte film by forming an electrolyte membrane 120 on a release film 130. In the electrolyte film manufacturing operation S110, the electrolyte membrane 120 may be formed by applying a spin coating, a spray coating, a slot-dye coating, a bar coating, a solution casting, and the like, using an electrolyte solution. The electrolyte solution may include an electrolyte and a polar solvent, and if necessary, may further include an additive. The polar solvent may include alcohol with 1 to 4 carbon atoms, dimethylacetamide, dimethylsulfoxide, dimethylformamide, 1-methyl-2-pyrrolidinone, tetrahydrofuran, glycerol, toluene, acetic acid, acetone, methylethylketone, and the like. Desirably, the polar solvent may include alcohol with 3 to 4 carbon atoms. The additive is described above and a further description related thereto is omitted. The electrolyte may be included in the electrolyte solution, at the concentration of 5% (w/v) to 30% (w/v), desirably, 10% (w/v) to 15% (w/v). If the concentration of the electrolyte is within the range, the electrolyte membrane 120 of a large area may be controlled to have a uniform thickness on the film 130. The release film 130 may be a release film that includes polypropylene (PP), polycarbonate (PC), polyester, such as, polybutylene terephtalate (PBT), polyethylene terephthalate (PET), etc., polyimide (PI), and the like.

For example, the electrolyte film drying operation S120 is an operation of drying the electrolyte film after the electrolyte film manufacturing operation S110. In the electrolyte film drying operation S120, the electrolyte film may be dried at the temperature of 90° C. to 150° C. after removing a solvent at the temperature of 40° C. to 80° C. After the drying, the electrolyte membrane 120 may be formed to have a thickness of 3 μm to 30 μm.

For example, the electrolyte film pretreatmenting operation S130 is an operation of pretreatmenting the electrolyte film by spraying a polar solvent over the electrolyte membrane 120 of the electrolyte film dried through the electrolyte film drying operation S120. When impregnating a porous support 110 with the electrolyte, it is possible to increase amount of impregnated electrolyte and to enhance an interfacial adhesive force between the porous support 110 and the electrolyte membrane 120. The polar solvent is described above and may be alcohol with, desirably, 3 to 4 carbon atoms. To prevent a degradation in the performance of the electrolyte membrane 120, such as the interfacial adhesive force, durability, and ionic conductance, etc., the polar solvent may be sprayed for 5 seconds to 30 seconds at 0.1 ml to 0.3 ml per 9 cm$^2$ (3 cm×3 cm).

The porous support preparing operation S200 is an operation of preparing the porous support 110 required for manufacturing the reinforced composite membrane. The porous support preparing operation S200 may include a porous film pretreatmenting operation S210. The porous support pretreatmenting operation S210 is an operation of pretreatmenting the porous support 110 by impregnating the porous support 110 with the polar solvent. In this manner, when impregnating the porous support 110 with the electrolyte, it is possible to increase the amount of impregnated electrolyte and to enhance the interfacial adhesive force. The polar solvent is described above and may be, desirably, alcohol with 3 to 4 carbon atoms. In the porous support pretreatmenting operation S210, pretreatmenting may be implemented at a room temperature to 50° C. for 30 minutes to 5 hours by spaying the polar solvent over the porous support 110 or by immersing the porous support 110 into the polar solvent.

For example, impurities may be removed by immersing the porous support 110 into the polar solvent for 30 minutes to 5 hours and by drying the same at the temperature of 40° C. to 80° C. for 10 minutes to 2 hours, prior to the porous support pretreatmenting operation S210.

The electrolyte film disposing operation S300 is an operation of disposing the electrolyte film prepared in the electrolyte film preparing operation S100 on one surface or each of both surfaces of the porous support 110 prepared in operation S200. Electrolyte membranes 120 and 120' of the electrolyte film are disposed to be in contact with the porous support 110.

The electrolyte membrane transferring operation S400 is an operation of forming a composite membrane by impregnating at least a portion of the electrolyte membrane 120, 120' of the electrolyte film into a depth direction of the porous support 110 through pressurization on one surface or both surfaces of the porous support 110 on which the electrolyte film is disposed after the electrolyte film disposing operation S300, and by coupling the remaining electrolyte membrane 120, 120' and a porous support 110'. The electrolyte membrane transferring operation S400 may employ a roll press to apply the pressure of 0.1 bar to 3 bar at the temperature of 40° C. to 120° C. in order to increase an amount of impregnated electrolyte in the porous support 110' and to achieve a thinness of the electrolyte membrane 120, 120'. When applying the roll press, it is possible to plasticize the surface of the electrolyte membrane 120, 120' through the electrolyte film pretreatmenting operation S130, to plasticize the electrolyte membrane 120, 120' through the polar solvent impregnated within the porous support 110, and to enhance an adhesive force between the electrolyte membrane 120, 120' and the porous support 110. Accordingly, through thermal compression using the roll press, the porous support 110 is impregnated with the electrolyte of the electrolyte membrane 120, 120' and at the same time, couples with the electrolyte membrane 120, 120'.

The separation operation S500 is an operation of acquiring the reinforced composite membrane in which the electrolyte membrane layer 120, 120' is formed on one surface or each of both surfaces of the porous support 110' impregnated with the electrolyte by removing the film 130 that is the electrolyte film after the electrolyte membrane transferring operation S400.

According to example embodiments, the reinforced composite membrane manufacturing method may further include a general reinforced composite membrane post-processing operation, for example, a drying operation, after the separation operation S500. In the drying operation, the electrolyte film may be dried using a hotplate or a vacuum oven at the temperature of 40° C. to 150° C. After the drying operation, the reinforced composite membrane with the thickness of 3 μm to 30 μm may be provided.

According to example embodiments, the reinforced composite membrane manufacturing method may provide a reinforced composite membrane through a continuous process by applying a roll-to-roll process. The roll-to-roll process enables the reinforced composite membrane to have a thin thickness and a large area, may reduce a production time, and may increase an amount of impregnated electrolyte within a porous support by applying a roll press to the roll-to-roll process.

Figure 4:
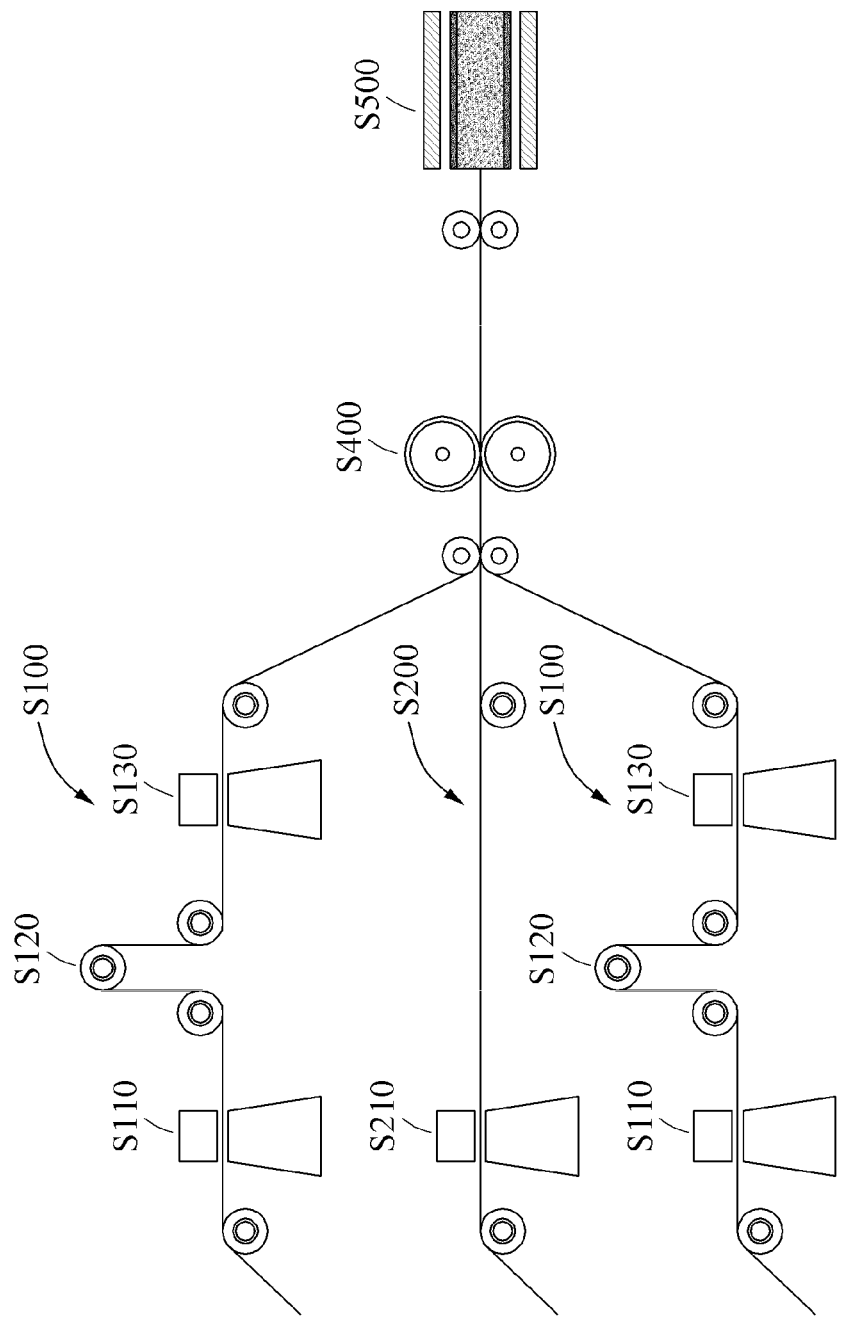
FIG. 4 illustrates an example of a roll-to-roll continuous process in a method of manufacturing a reinforced composite membrane according to at least one example embodiment.

FIG. 4 illustrates an example of a roll-to-roll continuous process in a method of manufacturing a reinforced composite membrane according to at least one example embodiment. The electrolyte film preparing operation S100 and the porous support preparing operation S200 may be simultaneously performed. In the electrolyte film preparing operation S100 and the porous support preparing operation S200, an additive may be added in order to enhance a use of the reinforced composite membrane, that is, the performance of a fuel cell. After disposing the electrolyte film prepared in the electrolyte film preparing operation S100 and the porous support 110 prepared in the porous support preparing operation S200, the reinforced composite membrane may be provided through the continuous process in the electrolyte membrane transferring operation S400 and the separation operation S500 using the roll press.

According to other example embodiments, the reinforced composite membrane manufacturing method may include the electrolyte film preparing operation S100, the porous support preparing operation S200, the electrolyte film disposing operation S300, the electrolyte membrane transferring operation S400, and the separation operation S500, and may provide a multilayered reinforced composite membrane by repeating the electrolyte film disposing operation S300, the electrolyte membrane transferring operation S400, and the separation operation S500.

Figure 5:
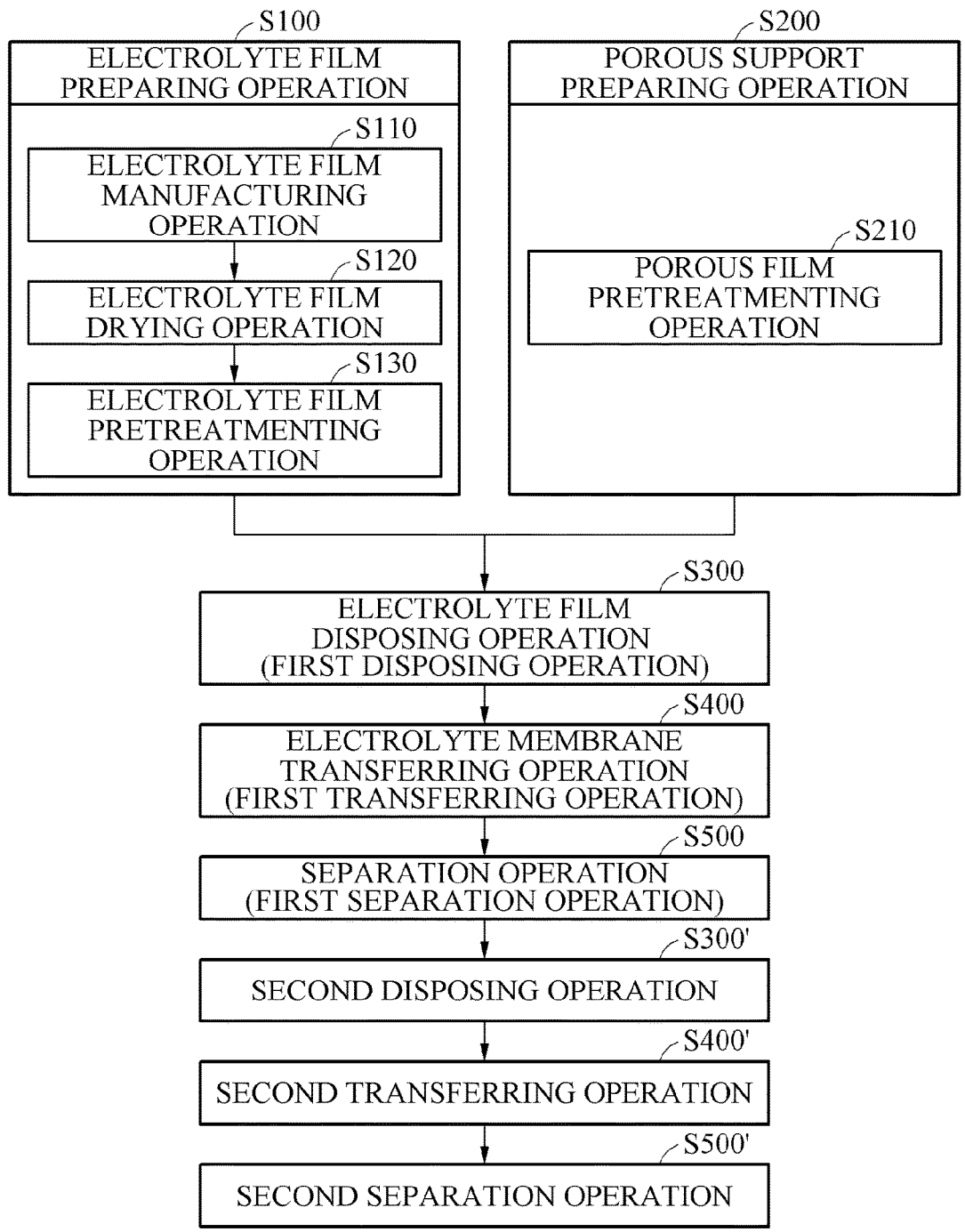
FIG. 5 is a flowchart illustrating another example of a method of manufacturing a reinforced composite membrane according to at least one example embodiment.

FIG. 5 is a flowchart illustrating another example of a method of manufacturing a reinforced composite membrane according to at least one example embodiment. Referring to FIG. 5, the reinforced composite membrane manufacturing method may include the electrolyte film preparing operation S100, the porous support preparing operation S200, the electrolyte film disposing operation S300 that is a first disposing operation, the electrolyte membrane transferring operation S400 that is a first transferring operation, and the separation operation S500 that is a first separation operation, a second disposing operation S300', a second transferring operation S400', and a second separation operation S500'.

Figure 6:
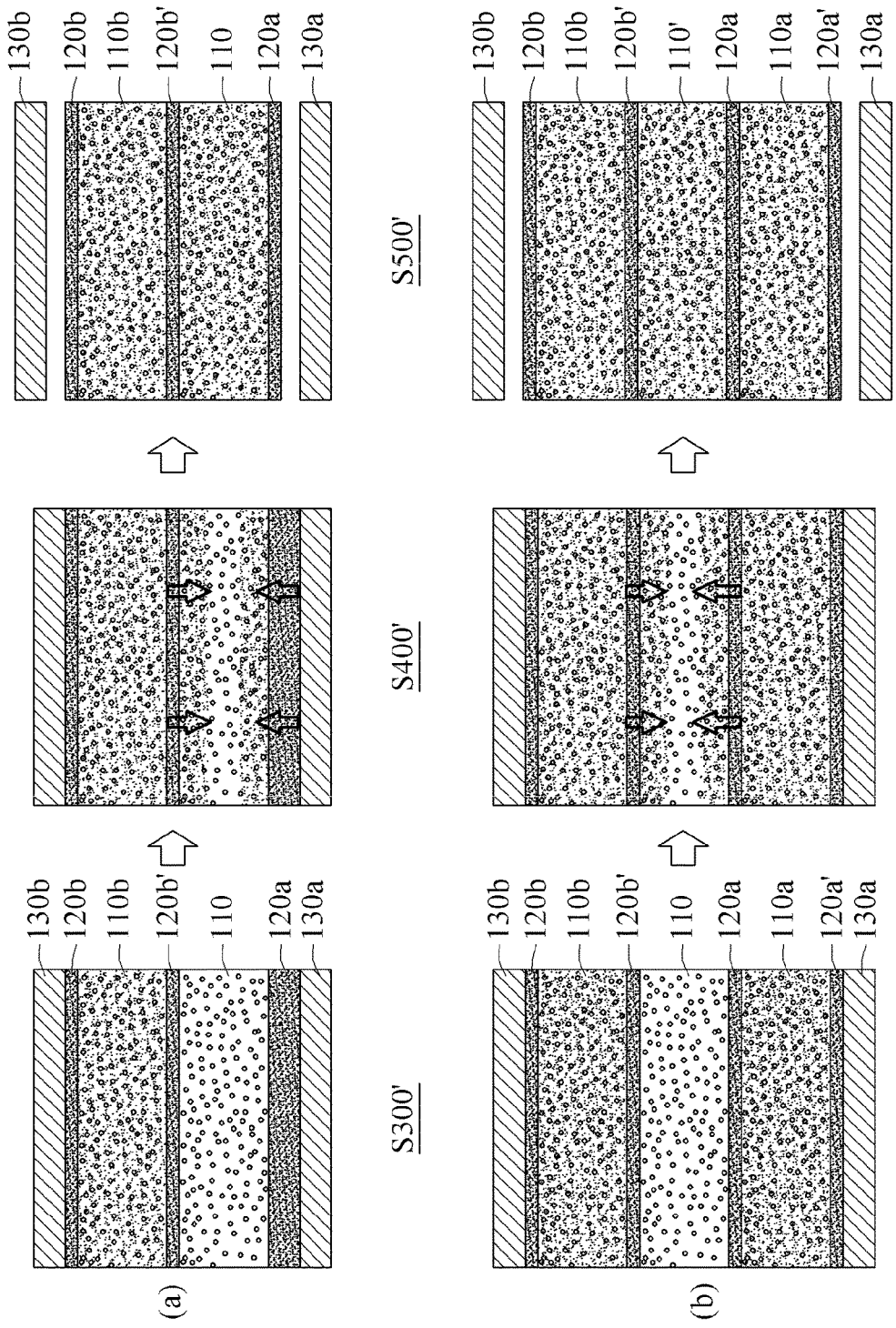
FIG. 6 illustrates another example of a process of manufacturing a reinforced composite membrane according to at least one example embodiment.

FIG. 6 illustrates another example of a process of manufacturing a reinforced composite membrane according to at least one example embodiment. The electrolyte film preparing operation S100, the porous support preparing operation S200, the electrolyte film disposing operation S300, and the electrolyte membrane transferring operation S400 of FIG. 6 are the same as described above. The separation operation S500 that is the first separation operation is an operation of separating a release film from one surface or both surfaces of the composite membrane formed in the electrolyte membrane transferring operation S400 that is the first transferring operation.

The second disposing operation 300' is an operation of disposing the electrolyte film to be in contact with one surface or both surfaces of the porous support 110. For example, referring to (a) of FIG. 6, the electrolyte membrane layer 120b' of the composite membrane may be provided to be in contact with one surface of the porous support 110 and the electrolyte membrane 120a of the electrolyte film may be disposed to be in contact with the other surface of the porous support 110. Alternatively, referring to (b) of FIG. 6, the electrolyte membrane layer 120b', 120a of the composite membrane may be disposed to be in contact with one surface or both surfaces of the porous support 110.

The second transferring operation 400' is an operation of transferring an electrolyte membrane to one surface or each of both surfaces of the porous support 110. For example, it is possible to form a multilayered reinforced composite membrane in which the porous support 110 is impregnated with the electrolyte membrane of the composite membrane and the electrolyte membrane of the electrolyte film and thereby coupled therewith. Alternatively, it is possible to form a multilayered reinforced composite membrane in which the porous support is impregnated with the electrolyte membrane of the composite membrane and thereby coupled therewith.

In the second separation operation 500' is an operation of separating the release film from the reinforced composite membrane after the second transferring operation 400'.

The example embodiments are described with reference to the accompanying drawings, however, are not limited thereto. The scope of the disclosure is defined not by the detailed description, but by the claims and their equivalents, and all variations within the scope of the claims and their equivalents are to be construed as being included in the disclosure.

Production Example 1: Manufacturing a Hydrocarbon Based Electrolyte Film

An electrolyte solution of 10 concentration % (w/v) was produced by completely dissolving a hydrocarbon based polymer of Formula 4, that is, polyphenyl sulfone polymer (ion exchange capacity: 1.30 meq/g dry resin, x=20, y=5, n=5 or more) into NMP. The produced electrolyte solution was casted on a PET release film. A solvent was vaporized in the hotplate of 70° C. for 8 hours, and was further dried at the temperature of 120° C. for 4 hours. Through this, the electrolyte film on which an electrolyte membrane with the thickness of 7±3 μm was manufactured. A proton-form electrolyte was produced by acid processing the electrolyte film using hydrochloric acid.

Production Example 2: Manufacturing a Perfluorinated Polymer Electrolyte Film

An electrolyte solution of 10 concentration % (w/v) was produced by substituting a perfluorinated polymer, that is, nafion dispersion solution (manufacturer: Dufont, product number: DE2021) with NMP. The produced electrolyte solution was casted on a PET release film. A solvent was vaporized in the hotplate of 70° C. for 8 hours and was further dried at the temperature of 120° C. for 4 hours. Through this, the electrolyte film on which an electrolyte membrane with the thickness of 7±3 μm was manufactured.

Production Example 3: Pretreatmenting a Polytetrafluoroethylene Porous Support

Impurities were removed from the inside of pores by impregnating a polytetrafluoroethylene porous support (PTFE, a thickness of 15 μm, a porosity of 80%, a pore size of 0.45 μm) with ethanol for 30 minutes and then vacuum drying the same at the temperature of 50☐ for 1 hour. Pretreatment of the polytetrafluoroethylene porous support was performed by impregnating the polytetrafluoroethylene porous support with butanol at the room temperature for 30 minutes.

Production Example 4: Pretreatmenting a Polyethylene Porous Support

Aside from using a polyethylene porous support (PE, a thickness of 15 μm, a porosity of 70%, a pore size of 0.45 μm), pretreatmenting was performed in the same manner as Production example 3.

Examples 1 Through 4

Referring to Table 1, a three-layered reinforced composite membrane on which each of the electrolyte membranes of Production examples 1 and 2 was formed on both surfaces of each of the preprocessed porous support of Production examples 3 and 4 was manufactured by thinly spraying butanol of 0.3 ml over the electrolyte membrane of the electrolyte film of each of Production examples 1 and 2 and by applying the pressure of 3 bar at the temperature of 80 to 100° C. using a roll press. A solvent was removed from the manufactured reinforced composite membrane at the temperature of 70° C. for 8 hours. Referring to Table 2, the reinforced composite membranes with the thickness of 20±5 μm were acquired.

[Formula 4]

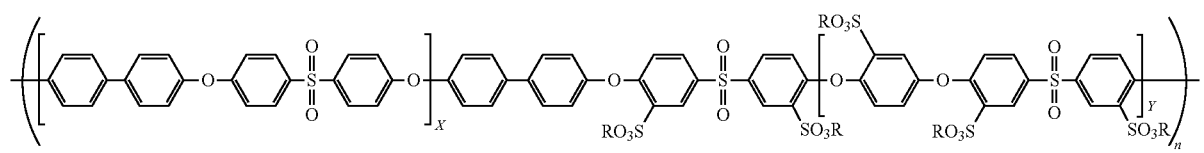

TABLE 1

| Electrolyte film porous support | Production example 3 | Production example 4 |
|---|---|---|
| Production example 1 | Example 1 | Example 2 |
| Production example 2 | Example 3 | Example 4 |

TABLE 2

| | Thickness (μm) of reinforced composite membrane |
|---|---|
| Example 1 | 21 |
| Example 2 | 19 |

TABLE 2-continued

| | Thickness (μm) of reinforced composite membrane |
|---|---|
| Example 3 | 20 |
| Example 4 | 22 |

Comparison Example 1

An electrolyte solution of 10 concentration % (w/v) was produced by completely dissolving a hydrocarbon based polymer of Formula 1, that is, polyphenyl sulfone polymer (ion exchange capacity: 1.50 meq/g dry resin) into NMP. The produced electrolyte solution was casted on a PET release film. The release film was removed by vaporizing a solvent in the hotplate of 70° C. for 8 hours, and by further drying the same at the temperature of 120° C. for 4 hours. Through this, an electrolyte membrane with the thickness of 20±5 μm was acquired.

Comparison Example 2

An electrolyte solution of 10 concentration % (w/v) was produced by completely dissolving a perfluorinated polymer of Formula 2, that is, nafion (ion exchange capacity: 0.9 meq/g dry resin) into NMP. The produced electrolyte solution was casted on a PET release film. The release film was removed by vaporizing a solvent in the hotplate of 70° C. for 8 hours, and by further drying the same at the temperature of 120° C. for 4 hours. Through this, an electrolyte membrane with the thickness of 20±5 μm was acquired.

Comparison Example 3

An electrolyte solution of 10 concentration % (w/v) was produced by substituting a perfluorinated polymer of Formula 2, that is, nafion dispersion solution (manufacturer: Dufont, product number: DE2021) with NMP. The produced electrolyte solution was casted on a polytetrafluoroethylene porous support (PTFE, a thickness of 15 um, a porosity of 80%, a pore size of 0.45 μm) and was vaporized through decompression at the temperature of 70° C. Through this, a reinforced composite membrane having an electrolyte membrane with the thickness of 22±5 μm was acquired.

Comparison Example 4

A reinforced composite membrane having an electrolyte membrane with the thickness of 20±5 μm was acquired in the same manner as Example 3 using the electrolyte film of Production example 2 and a non-preprocessed polytetrafluoroethylene porous support (PTFE, a thickness of 15 μm, a porosity of 80%, a pore size of 0.45 μm).

Evaluation Example 1: Percentage of Water Content

The percentage of water content was calculated based on a weight difference between a weight before drying and a weight after drying after immersing the membrane manufactured in each of Example 1 through Example 4 and Comparison example 1 through Comparison example 4 into ultrapure water at the temperature of 25° C. for 24 hours. The percentage of water uptake (%) was calculated according to the following Equation 1.

$$\text{Water uptake (\%)} = \frac{\text{Weight of water absorbed by polymer} (\Delta W)}{\text{Dry weight of polymer} (W_{dry})} \times 100 \quad \text{[Equation 1]}$$

Evaluation Example 2: Dimensional Stability

Similar to the percentage-of-water content measuring method, a change between an area of the electrolyte membrane before impregnation and an area of the electrolyte membrane after impregnation was calculated by immersing the membrane manufactured in each of Example 1 through Example 4 and Comparison example 1 through Comparison example 4 into ultrapure water at the temperature of 25° C. for 24 hours. A percent of dimensional change (%) was calculated according to the following Equation 2.

$$\text{Percent of dimensional change (\%)} = \frac{\text{Change in area of membrane after impregnation} (\Delta A)}{\text{Area of membrane in dried state} (A_{dry})} \times 100 \quad \text{[Equation 2]}$$

TABLE 3

| | Example 1 | Example 2 | Example 3 | Example 4 | Comparison example 1 | Comparison example 2 | Comparison example 3 | Comparison example 4 |
|---|---|---|---|---|---|---|---|---|
| percentage of water uptake | 40 | 45 | 42 | 40 | 66 | 55 | 50 | 48 |
| percent of dimensional change | 23 | 5 | 19 | 3 | 57 | 34 | 33 | 26 |

Referring to Table 3, it can be verified that the reinforced composite membranes of Example 1 through Example 4 each to which the porous support was applied show a relatively low percentage-of-wateruptake and dimensional change compared to the electrolyte membranes of Comparison example 1 and Comparison example 2 each to which the porous support was not applied. That is, when applying the porous support, it is possible to enhance the mechanical stability of the electrolyte membrane. Also, it can be verified that Comparison example 3 and Comparison example 4 each to which the porous support was applied show a relatively high percentage of water content and dimensional change compared to Examples. That is, since the interfacial adhesive force between the porous support and the electrolyte membrane is relatively low or an amount of impregnated electrolyte is relatively low, the mechanical stability by the porous support may be predicted to be insufficient.

Evaluation Example 3: Proton Conductivity

Proton conductance was measured by cutting the membrane manufactured in each of Example 1 through Example 4 and Comparison example 1 through Comparison example 4 into sizes with 4 cm, 1 cm, by mounting each cut membrane to a cell, by placing the cell in distilled water of 25° C. and by connecting each electrode of the cell to an impedance measurement device. An impedance value measured in each section was calculated as a proton conductivity according to the following Equation 3.

$$\text{Proton conductivity } (S/cm) = \frac{D}{L \times B \times R} \quad \text{[Equation 3]}$$

In Equation 3, D denotes a distance between a reference electrode and a sensing electrode, L denotes a width of a film, B denotes a thickness of the film, and R denotes an impedance measurement value.

TABLE 4

| | Example 1 | Example 2 | Example 3 | Example 4 | Comparison example 1 | Comparison example 2 | Comparison example 3 | Comparison example 4 |
|---|---|---|---|---|---|---|---|---|
| Proton conductivity (mS/cm) | 83 | 86 | 88 | 89 | 90 | 89 | 75 | 79 |

Referring to Table 4, Example 1 through Example 4 show a relatively slightly low proton conductivity compared to Comparison example 1 and Comparison example 2. Also, the electrolyte membrane of Comparison example 3 manufactured using an existing method without employing a porous support pretreatmenting process and a roll press process and the electrolyte membrane of Comparison example 4 manufactured using a non-preprocessed porous support show a relatively low proton conductivity compared to Example 1 through Example 4.

From the results, according to some example embodiments, by introducing a porous support pretreatmenting tprocess and a roll press process, it is possible to enhance an amount of impregnated electrolyte within a porous support and an interfacial adhesive force, and to manufacture an electrolyte membrane formed on the porous support to have a thin thickness. Accordingly, it is possible to further enhance hydrogen ionic conductance.

According to some example embodiments, there may be provided a reinforced composite membrane that may maintain excellent characteristics of an electrolyte membrane and enhance a mechanical stability such as dimensional stability and the like. Further, the reinforced composite membrane may be manufactured to have a thin thickness and a large area.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of manufacturing a reinforced composite membrane, the method comprising:
   manufacturing an electrolyte film that forms an electrolyte membrane on a release film;
   disposing the electrolyte film on one surface or each of both surfaces of a porous support; and
   transferring the electrolyte membrane of the electrolyte film on one surface or each of both surfaces of the porous support to form a composite membrane,
   wherein the transferring is performed through a roll press process at the temperature of 40° C. to 120° C., and
   a part of the porous support is impregnated with an electrolyte during the transferring.

2. The method of claim 1, wherein the electrolyte membrane is formed using an electrolyte solution that includes the electrolyte and a polar solvent, and
   the electrolyte is included in the electrolyte solution at the concentration of 5 to 30% (w/v).

3. The method of claim 1, further comprising:
   drying the electrolyte film after manufacturing the electrolyte film,
   wherein the drying comprises forming the electrolyte membrane with a thickness of 3 µm to 30 µm at the temperature of 90° C. to 150° C. after removing a solvent at the temperature of 40° C. to 80° C.

4. The method of claim 1, further comprising:
   pretreatmenting the electrolyte film by spraying a polar solvent over the electrolyte film, prior to the disposing of the electrolyte film.

5. The method of claim 1, further comprising:
   pretreatmenting the porous support by immersing the porous support into a polar solution for impregnation, prior to the disposing of the electrolyte film,
   wherein the pretreatmenting of the porous support is implemented at a room temperature to 50° C. for 30 minutes to 5 hours.

6. The method of claim 1, further comprising:
   separating the release film from one surface of the composite membrane after the transferring;
   disposing the composite membrane to make an electrolyte membrane layer from which the release film is separated contact with one surface or each of both surfaces of the porous support; and
   transferring the electrolyte membrane of the composite membrane on one surface or each of both surfaces of the porous support.

7. The method of claim 1, further comprising:
   separating the release film from one surface of the composite membrane after the transferring;
   disposing the composite membrane and the electrolyte film to make each of an electrolyte membrane layer from which the release film is separated and the electrolyte membrane of the electrolyte film contact with one surface of the porous support; and transferring the electrolyte membrane to each of both surfaces of the porous support.

\* \* \* \* \*